United States Patent
DeRosa et al.

(10) Patent No.: US 9,470,325 B2
(45) Date of Patent: Oct. 18, 2016

(54) SINGLE AND GROUPED PRESSURE VALVES

(71) Applicant: Kulite Semiconductor Products, Inc., Leonia, NJ (US)

(72) Inventors: Lou DeRosa, Wayne, NJ (US); Robert Gardner, Westwood, NJ (US); Joseph R. VanDeWeert, Maywood, NJ (US); Scott Goodman, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 80 days.

(21) Appl. No.: 14/271,441

(22) Filed: May 6, 2014

(65) Prior Publication Data

US 2015/0323086 A1    Nov. 12, 2015

(51) Int. Cl.

| | |
|---|---|
| *F16K 11/02* | (2006.01) |
| *F16K 11/078* | (2006.01) |
| *F16K 11/085* | (2006.01) |

(52) U.S. Cl.
CPC .......... *F16K 11/078* (2013.01); *F16K 11/0856* (2013.01); *Y10T 137/86662* (2015.04)

(58) Field of Classification Search
USPC .............. 137/625.16, 625.17, 625.19, 636.4, 137/625.47
See application file for complete search history.

(56) References Cited

U.S. PATENT DOCUMENTS

| | | | | | |
|---|---|---|---|---|---|
| 1,242,234 | A | * | 10/1917 | Pierce | F23D 14/64 137/625.47 |
| 2,335,085 | A | * | 11/1943 | Roberts | F16K 11/0833 137/625 |
| 2,371,657 | A | * | 3/1945 | Stark | F16K 11/085 251/182 |
| 2,389,000 | A | * | 11/1945 | Roberts | F16K 5/12 137/625.11 |
| 2,547,116 | A | * | 4/1951 | Gould | F16K 5/0478 251/297 |
| 2,655,167 | A | * | 10/1953 | Dunkelow | F15B 13/06 137/102 |
| 3,721,265 | A | * | 3/1973 | Hoffland | F16K 11/08 137/625.47 |
| 6,308,739 | B1 | * | 10/2001 | Barbuto | F16K 5/0478 137/625.11 |

* cited by examiner

*Primary Examiner* — John Fox
(74) *Attorney, Agent, or Firm* — Troutman Sanders LLP; James E. Schutz; Mark Lehi Jones

(57) ABSTRACT

This disclosure provides example methods, devices, and systems for a single and grouped pressure valve. In one embodiment, a pressure valve may include a housing having a first input port and a plurality of output ports and defining a cavity disposed therein; a flow coupler disposed in the cavity of the housing and having a passage transversely disposed therethrough, wherein the flow coupler is movable within the cavity of the housing; wherein a first alignment position of the flow coupler in the cavity of the housing allows fluid flow from the first input port of the housing through the passage of the flow coupler to all of the plurality of output ports of the housing; and wherein a second alignment position of the flow coupler in the cavity of the housing allows fluid flow from the first input port of the housing through the passage of the flow coupler to one of the plurality of output ports of the housing.

11 Claims, 5 Drawing Sheets

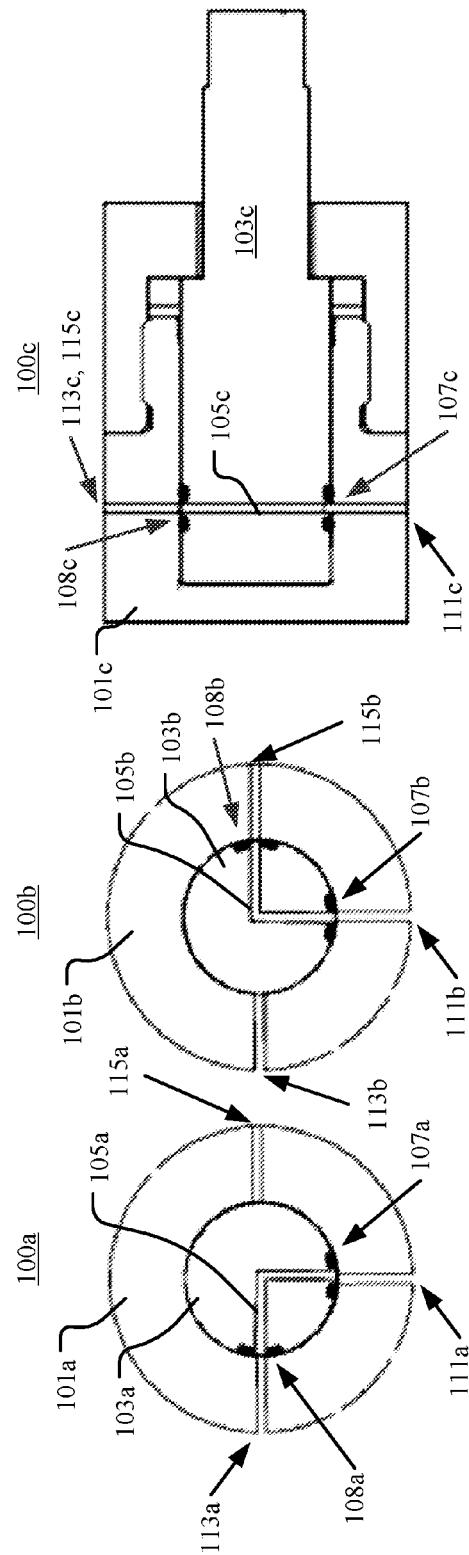

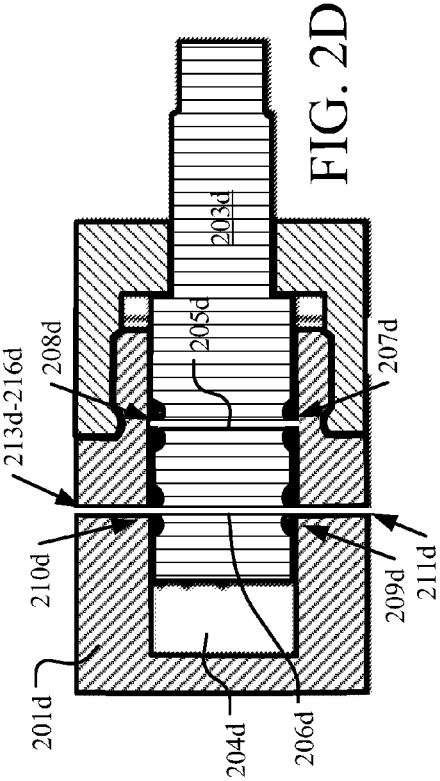
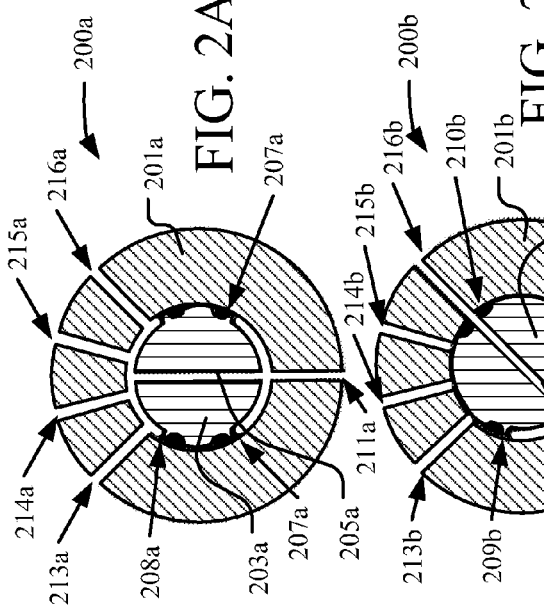
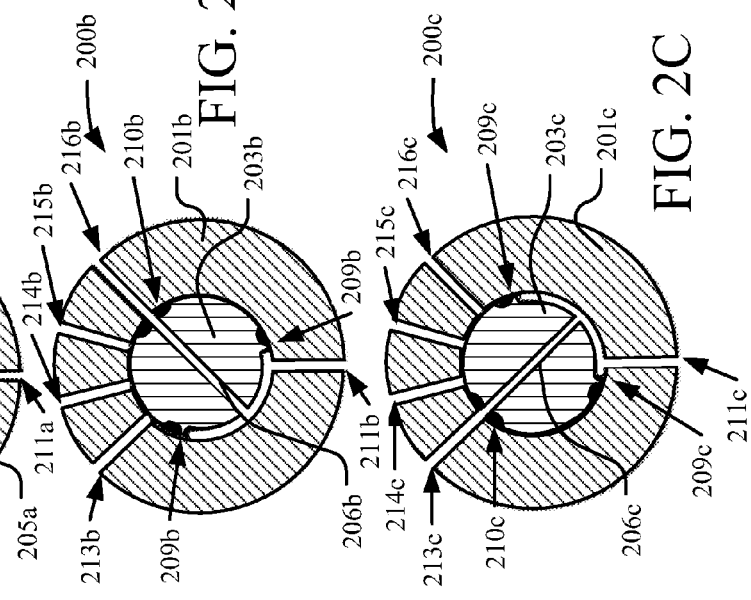

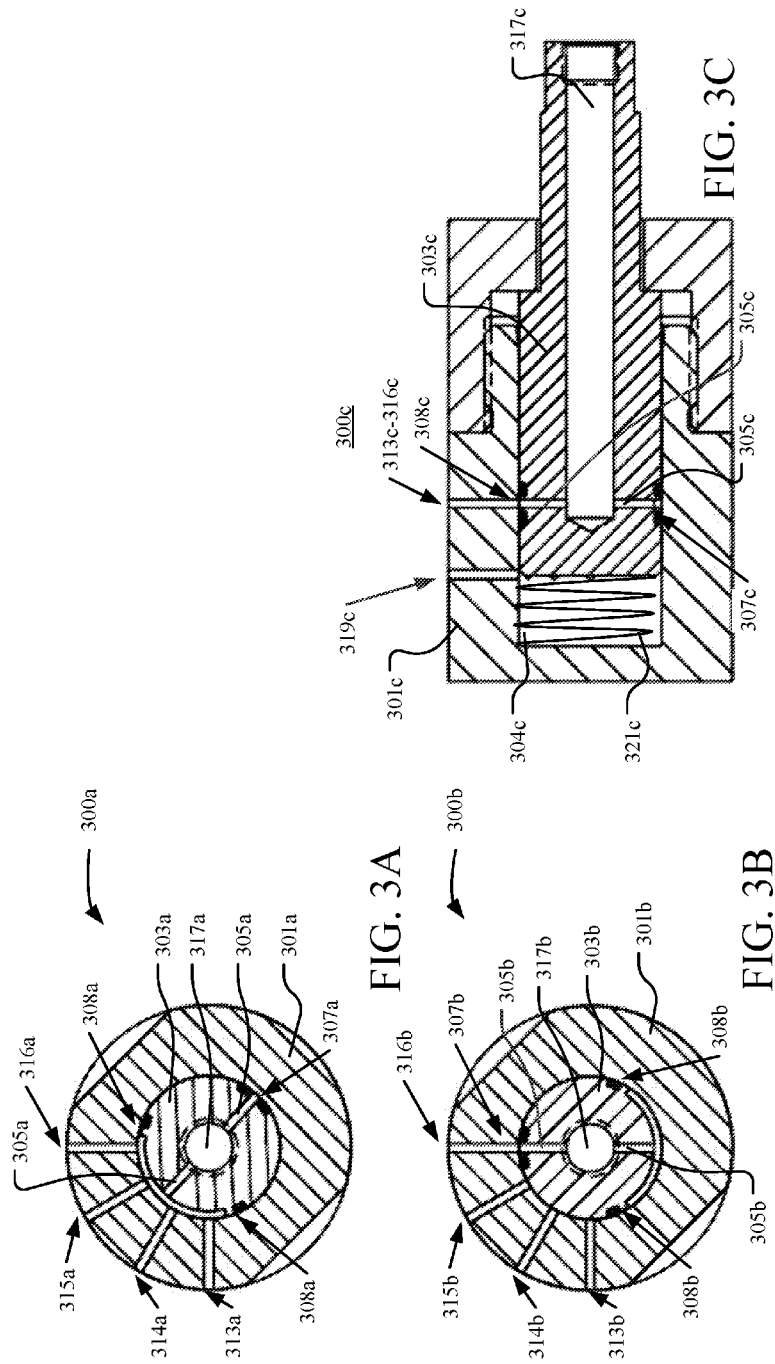

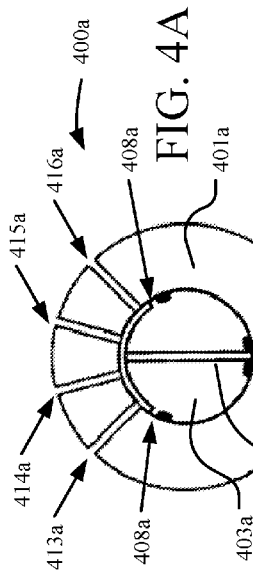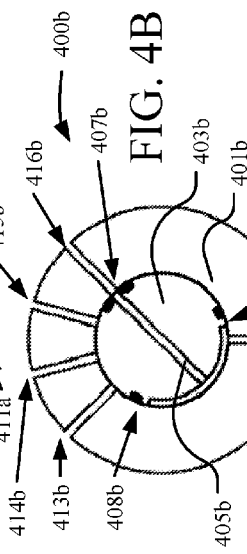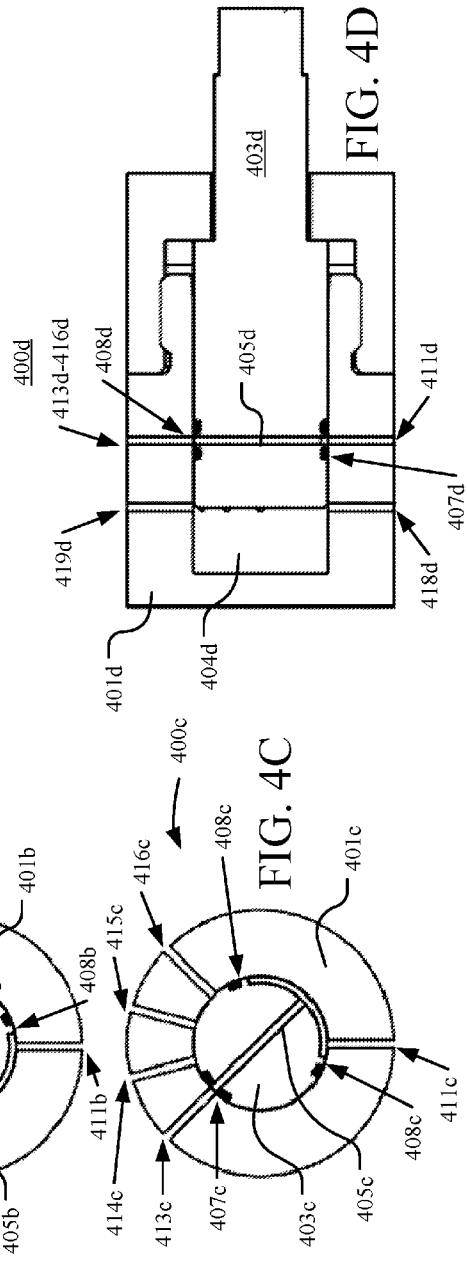

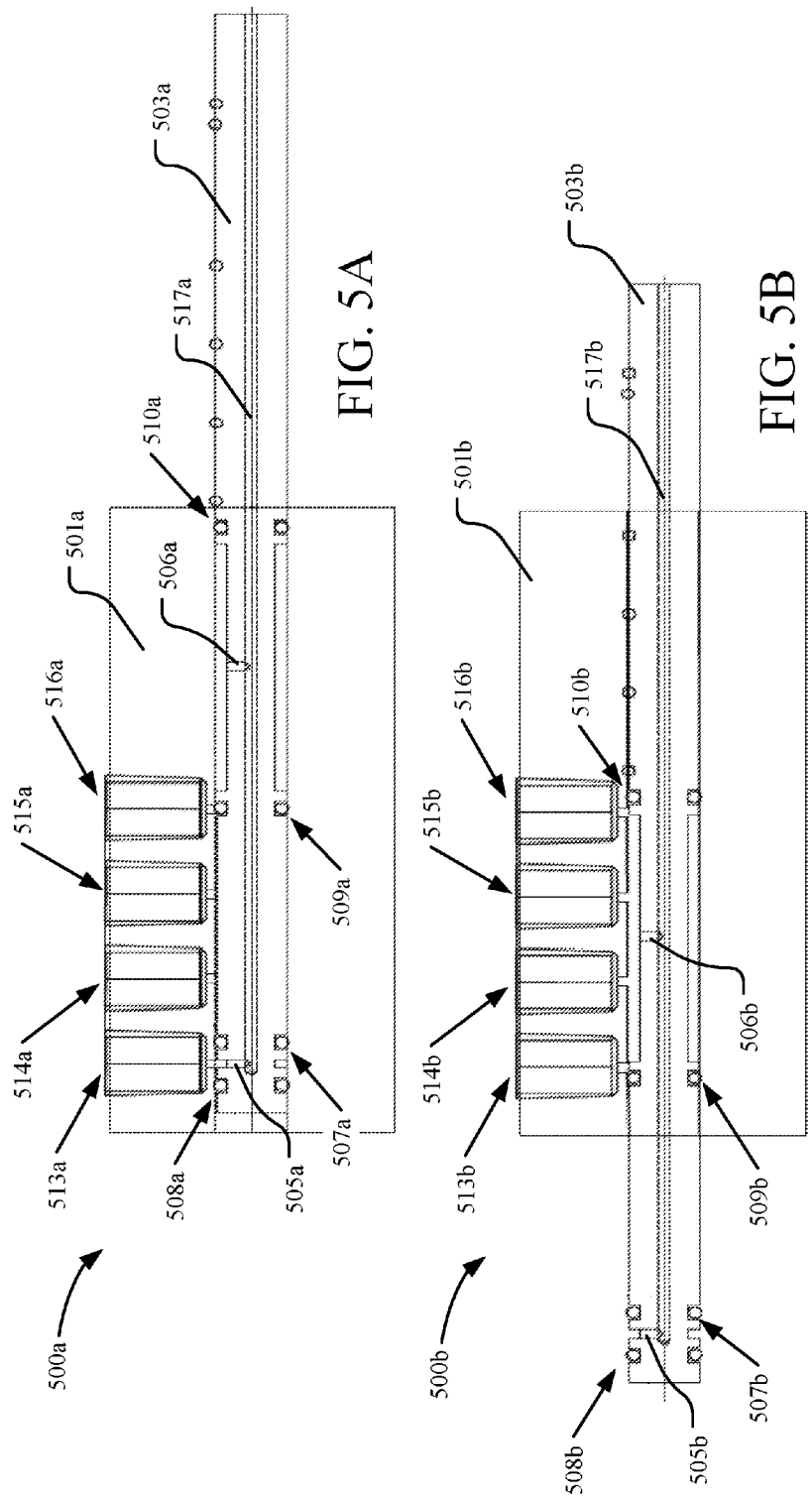

SINGLE AND GROUPED PRESSURE VALVES

TECHNICAL FIELD

This disclosure generally relates to pressure valves and more particularly to a single and grouped pressure valve.

BACKGROUND

Pressure manifolds and pressure switches are common equipment such as used for testing. They are used to apply pressure to a variety of locations such as grouped pressure locations in the case of a pressure manifold and an individual pressure location in the case of a pressure switch. In some applications, it is desirable to simultaneously apply fluid flow, which may also be referred to as pressure, at all of a plurality of pressure locations during one instance and to individually apply fluid flow at a particular pressure location during another instance. This technique may be used to determine, for instance, a source of a pressure leak associated with the plurality of pressure locations. Further, this technique may be expedited by simultaneously applying fluid flow to all of the plurality of pressure locations to determine whether a pressure leak exists and then individually applying fluid flow to each of the plurality of pressure locations to determine the source of the leak. Currently, this technique may be accomplished by using a complex series of pressure switches or pressure check valves such that the fluid flow may be shut off at some pressure locations while being applied at other pressure locations and without the fluid flow leaking from one pressure location to another pressure location.

FIGS. 1A to 1C show various views of a prior art pressure switch 100a-c. FIGS. 1A and 1B illustrate a transverse cross-section of the prior art pressure switch 100a-b. FIG. 1C illustrates a longitudinal cross-section of the prior art pressure switch 100c. The pressure switch 100a-c has a housing 101a-c, a flow coupler 103a-c, an input port 111a-c, a first output port 113a-c and a second output port 115a-c. Pressure enters through the input port 111a-c of the housing 101a-c and passes to the flow coupler 103a-c through an O-ring seal 107a-c. The flow coupler 103a-c is disposed around and defines a passage 105a-c, which allows fluid flow to be blocked or pass from the input port 111a-c to the first output port 113a-b or the second output port 115a-115b through a second O-ring seal 108a-c of the flow coupler 103a-c. In FIG. 1A, when the flow coupler 103a is rotated such that a first end of the passage 105a is coupled to the input port 111a and a second end of the passage 105a is coupled to the first output port 113a, the fluid flow passes from the input port 111a through the passage 105a to the first output port 113a. In FIG. 1B, when the flow coupler 103b is rotated such that the second end of the passage 105b is coupled to the input port 111b and the first end of the passage 105b is coupled to the second output port 115b, the fluid flow passes from the input port 111b through the passage 105b to the second output port 115b. However, the flow coupler 103b does not have a configuration that allows fluid flow to simultaneously pass from the input port 111b to the first output port 113b and the second output port 115b. Accordingly, there is a need for improved techniques to allow for a single and grouped pressure valve. In addition, other desirable features and characteristics of the present disclosure will become apparent from the subsequent detailed description and claims, taken in conjunction with the accompanying figures and the foregoing technical field and background.

SUMMARY OF THE DISCLOSURE

Briefly described, embodiments of the present invention relate to a single and grouped pressure valve. According to one aspect, a pressure valve may include a housing having a first input port and a plurality of output ports and may define a cavity disposed therein. A flow coupler may be disposed in the cavity of the housing and may have a passage transversely disposed therethrough. Further, the flow coupler may be movable within the cavity of the housing. A first alignment position of the flow coupler in the cavity of the housing may allow fluid flow from the first input port of the housing through the passage of the flow coupler to all of the plurality of output ports of the housing. Also, a second alignment position of the flow coupler in the cavity of the housing may allow fluid flow from the first input port of the housing through the passage of the flow coupler to one of the plurality of output ports of the housing.

According to another aspect, a pressure valve may include a housing having an input port and a plurality of output ports and may define a cavity disposed therein. A flow coupler may be disposed in the cavity of the housing. A first portion of the flow coupler may have a first passage transversely disposed therethrough and a second portion of the flow coupler may also have a second passage transversely disposed therethrough. The flow coupler may be movable within the housing. A first alignment position of the flow coupler in the cavity of the housing may allow fluid flow from the input port of the housing through the first passage of the flow coupler to one or more of the plurality of output ports of the housing. A second alignment position of the flow coupler in the cavity of the housing may allow fluid flow from the input port of the housing through the second passage of the flow coupler to one of the plurality of output ports of the housing.

According to another aspect, a pressure valve may include a housing having a plurality of second output ports and defining a cavity disposed therein. A flow coupler may have an input port longitudinally disposed therethrough and a passage transversely disposed therethrough. The flow coupler may be disposed in the cavity of the housing and may be movable within the cavity. Further, the input port of the flow coupler may be coupled to the passage. A first alignment position of the flow coupler in the cavity of the housing may allow fluid flow from the input port of the flow coupler through the passage of the flow coupler to one or more of the plurality of output ports of the housing. Also, a second alignment position of the flow coupler in the cavity of the housing may allow fluid flow from the input port of the flow coupler through the passage of the flow coupler to one of the plurality of output ports of the housing.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where:

FIGS. 1A to 1C show various views of a prior art pressure switch. FIGS. 1A and 1B illustrate a transverse cross-section of the prior art pressure switch. FIG. 1C illustrates a longitudinal cross-section of the prior art pressure switch.

FIGS. 2A to 2D illustrate various views of one embodiment of a pressure valve in accordance with various aspects set forth herein. FIG. 2A illustrates one embodiment of a transverse cross-section of the pressure valve including a first portion of a flow coupler in accordance with various aspects set forth herein. FIG. 2B illustrates one embodiment of a transverse cross-section of the pressure valve including a second portion of the flow coupler in accordance with various aspects set forth herein. FIG. 2C illustrates one embodiment of another transverse cross-section of the pressure valve including the second portion of the flow coupler in accordance with various aspects set forth herein. FIG. 2D illustrates one embodiment of a longitudinal cross-section of the pressure valve in accordance with various aspects set forth here in.

FIGS. 3A to 3C illustrate various views of another embodiment of a pressure valve in accordance with various aspects set forth herein. FIG. 3A illustrates another embodiment of a transverse cross-section of the pressure valve in accordance with various aspects set forth herein. FIG. 3B illustrates another embodiment of a transverse cross-section of the pressure valve in accordance with various aspects set forth herein. FIG. 3C illustrates another embodiment of a longitudinal cross-section of the pressure valve in accordance with various aspects set forth herein.

FIGS. 4A to 4D illustrate another embodiment of a pressure valve in accordance with various aspects set forth herein. FIG. 4A illustrates another embodiment of a transverse cross-section of the pressure valve including a first portion of a flow coupler in accordance with various aspects set forth herein. FIG. 4B illustrates another embodiment of a transverse cross-section of the pressure valve including a second portion of the flow coupler in accordance with various aspects set forth herein. FIG. 4C illustrates another embodiment of another transverse cross-section of the pressure valve including the second portion of the flow coupler in accordance with various aspects set forth herein. FIG. 4D illustrates another embodiment of a longitudinal cross-section of the pressure valve in accordance with various aspects set forth herein.

FIGS. 5A to 5B illustrate various views of another embodiment of a pressure valve in accordance with various aspects set forth herein. FIG. 5A illustrates another embodiment of a transverse cross-section of the pressure valve in accordance with various aspects set forth herein. FIG. 5B illustrates another embodiment of a transverse cross-section of the pressure valve in accordance with various aspects set forth herein.

DETAILED DESCRIPTION

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein my be used for a single and grouped pressure valve. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

This disclosure presents a single and grouped pressure valve. By configuring a pressure valve in accordance with various aspects described herein, an improved capability of the pressure valve is provided. For instance, a pressure valve may include a flow coupler positioned within its housing. The housing may include an input port and multiple output ports transversely positioned thereon. The flow coupler may be axially or radially moved within the housing to couple the input port to one or more output ports based on various alignment positions of the flow coupler. Passages through the flow coupler may be used to direct fluid flow from the input port to the one or more output ports. In a first alignment position of the flow coupler in the housing of the pressure valve, a first passage in a first portion of the flow coupler may be used to couple the input port to multiple output ports. In a second alignment position of the flow coupler in the housing of the pressure valve, a second passage in a second portion of the flow coupler may couple the input port to a single output port. In one example, FIGS. 2A to 2D illustrate one embodiment of a pressure valve 200a-d in accordance with various aspects set forth herein. FIG. 2A illustrates one embodiment of a transverse cross-section of the pressure valve 200a including a first portion of the flow coupler 203a in accordance with various aspects set forth herein. FIGS. 2B and 2C illustrate one embodiment of a transverse cross-section of the pressure valve 200b-c including a second portion of the flow coupler 203b-c in accordance with various aspects set forth herein. FIG. 2D illustrates one embodiment of a longitudinal cross-section of the pressure valve 200d in accordance with various aspects set forth herein. In FIGS. 2A to 2D, the pressure valve 200a-d may be configured to include a housing 201a-d and a flow coupler 203a-d. The housing 201a-d may be configured to include an input port 211a-d and a plurality of output ports 213a-d to 216a-d. Further, the housing 201a-d may be disposed around and may define a cavity. The flow coupler 203a-d may be disposed in the cavity of the housing 201a-d. A shape of the flow coupler 203a-d may allow for rotational or axial movement of the flow coupler 203a-d in the cavity of the housing 201a-d. In one example, the shape of the flow coupler 203a-d may be cylindrical. Further, a shape of the cavity of the housing 201a-d may allow for rotational or axial movement of the flow coupler 203a-d. In one example, the shape of the cavity of the housing 201a-d may be substantially similar to the shape of the flow coupler 203a-d. In another example, the shape of the cavity of the housing 201a-d may be cylindrical. A longitudinal length of the cavity of the housing 201a-d may allow for axial movement of the flow coupler 203a-d in the cavity of the housing 201a-d.

In FIG. 2A, the first portion of the flow coupler 203a may be configured to include a first passage 205a, which may be transversely disposed through the first portion of the flow coupler 203a. Further, the first portion of the flow coupler 203a may be disposed around and may define the first passage 205a. The first portion of the flow coupler 203a may be configured to include a first seal 207a and a second seal 208a. The first seal 207a may be coupled to a first end of the first passage 205a of the first portion of the flow coupler 203a. The first seal 207a may be used to couple the first end of the first passage 205a to the input port 211a, one or more of the plurality of output ports 213a-216a, an inner surface of the housing 201a or the like. The first seal 207a may be a large O-ring. In one example, a radial width of an opening associated with the first seal 207a may be about a radial width between the furthest separated output ports of the plurality of output ports 213a-216a at an inner surface of the housing 201a. In another example, the radial width of the opening associated with the first seal 207a may be sufficient to couple the first end of the first passage 205a to all of the plurality of output ports 213a-216a.

Furthermore, the second seal 208a may be coupled to a second end of the first passage 205a of the first portion of the flow coupler 203a. The second seal 208a may be used to couple the second end of the first passage 205a to the input port 211a, one or more of the plurality of output ports 213a-216a, an inner surface of the housing 201a or the like. In one example, the first seal 207a is used to couple the first end of the first passage 205a to the input port 211a while the second seal 208a is used to couple the second end of the first passage 205a to the one or more of the plurality of output ports 213a-216a. In another example, the second seal 208a is used to couple the second end of the first passage 205a to the input port 211a while the first seal 207a is used to couple the first end of the first passage 205a to the one or more of the plurality of output ports 213a-216a. The second seal 208a may be a large O-ring. In one example, a radial width of an opening associated with the second seal 208a at the second end of the first passage 205a of the flow coupler 203a may be about a radial width between the furthest separated output ports of the plurality of output ports 213a-216a at an inner surface of the housing 201a. In another example, the radial width of the opening associated with the second seal 208a may be sufficient to couple the second end of the first passage 205a to all of the plurality of output ports 213a-216a.

In FIG. 2A, the pressure valve 200a may be configured to allow the flow coupler 203a in the cavity of the housing 201a to be placed into a plurality of alignment positions by using axial or radial movement thereof. A first alignment position of the flow coupler 203a in the cavity of the housing 201a may configure the pressure valve 200a to allow fluid flow from the input port 211a through the passage 205a to one or more of the plurality of output ports 213a-216a. In one example, the flow coupler 203a is pushed into the cavity of the housing 201a to engage the pressure valve 200a as a pressure manifold. The first alignment position may couple the input port 211a to the first end of the first passage 205a using the first seal 207a. Further, the first alignment position may couple one or more of the plurality of output ports 213a-216a to the second end of the first passage 205a using the second seal 208a.

In FIGS. 2B and 2C, the second portion of the flow coupler 203b-c may be configured to include a second passage 206b-c, which may be transversely disposed through the second portion of the flow coupler 203b-c. Further, the second portion of the flow coupler 203b-c may be disposed around and may define the second passage 206b-c. The second portion of the flow coupler 203b-c may be configured to include a third seal 209b-c and a fourth seal 210b-c. The third seal 209b-c may be coupled to a first end of the second passage 206b-c. The third seal 209b-c may be used to couple the first end of the second passage 206b-c to the input port 211b-c, one or more of the plurality of output ports 213b-c to 216b-c, an inner surface of the housing 201b-c or the like. In one example, the third seal 209b-c is used to couple the first end of the second passage 206b-c to the input port 211b-c. The third seal 209b-c may be a large O-ring. In one example, a radial width of an opening associated with the third seal 209b-c at the first end of the second passage 206b-c may allow the second end of the second passage 206b-c to radially move to each of the plurality of output ports 213b-c to 216b-c while coupling the input port 211b-c to the first end of the second passage 206b-c using the third seal 209b-c. In another example, the radial width of the opening associated with the third seal 209b-c at the first end of the second passage 206b may be about a radial width between the furthest separated output ports of the plurality of output ports 213b-c to 216b-c. In another example, the radial width of the opening associated with the third seal 209b-c may be sufficient to couple the first end of the second passage 206b-c to all of the plurality of output ports 213b-c to 216b-c.

Furthermore, the fourth seal 210b-c may be coupled to a second end of the second passage 206b-c of the second portion of the flow coupler 203b-c. The fourth seal 210b-c may be used to couple the second end of the second passage 206b-c to the input port 211b-c, one or more of the plurality of output ports 213b-c to 216b-c, an inner surface of the housing 201b-c or the like. The fourth seal 210b-c may be a small O-ring. A radial width of an opening of the fourth seal 210b-c at the second end of the second passage 206b-c may be sufficient to allow the second end of the second passage 206b-c to couple to one of the plurality of output ports 213b-c to 216b-c. In one example, a radial width of an opening of the fourth seal 210b-c may be about a radial width of one of the plurality of output ports 213*b-c* to 216*b-c* at the inner wall of the housing 201*b-c*. In another example, the radial width of the opening associated with the fourth seal 210*b-c* may be sufficient to couple the second passage 206*b-c* to one of the plurality of output ports 213*b-c* to 216*b-c*.

In FIG. 2B, a second alignment position may result from an axial or radial movement of the flow coupler 203*b* in the cavity of the housing 201*b* such as an axial movement from the first alignment position to the second alignment position. The second alignment position may allow fluid flow from the input port 211*b* through the second passage 206*b* to one of the plurality of output ports 213*b*-216*b*. In one example, the flow coupler 203*b* is pulled away from the cavity of the housing 201*b* to engage the pressure valve 200*b* as a pressure switch. The second alignment position may configure the pressure valve 200*b* to allow fluid flow at one of the plurality of output ports 213*b*-216*b*. The second alignment position of the flow coupler 203*b* in the cavity of the housing 201*b* may couple the input port 211*b* to the first end of the second passage 206*b* using the third seal 209*b*. Further, the second alignment position may couple one of the plurality of output ports 213*b*-216*b* to the second end of the second passage 206*b* using the fourth seal 210*b*.

In FIG. 2C, a third alignment position may result from an axial or radial movement of the flow coupler 203*c* in the cavity of the housing 201*c* such as a radial movement from the second alignment position to the third alignment position. The third alignment position, like the second alignment position, may configure the pressure valve 200*c* to allow fluid flow at another one of the plurality of output ports 213*c*-216*c*. The third alignment position may couple the input port 211*c* to the first end of the second passage 206*c* using the third seal 209*c*. Further, the third alignment position may couple the other one of the plurality of output ports 213*c*-216*c* to the second end of the second passage 206*c* using the fourth seal 210*c*. The third alignment position may allow fluid flow from the input port 211*c* through the second passage 206*c* to the other one of the plurality of output ports 213*c*-216*c*.

In FIG. 2D, a portion of the cavity 204*d* of the housing 201*d* may be used to allow the flow coupler 203*d* to be axially moved in the cavity of the housing 201*d* such as between the first alignment position and the second alignment position.

In another embodiment, a passage of a flow coupler may be curved or angled such as described in FIGS. 1A to 1C.

In another embodiment, a pressure valve may be configured to include a fourth alignment position. The fourth alignment position may result from an axial or radial movement of a flow coupler in a cavity of a housing. The fourth alignment position may configure the pressure valve to allow fluid flow to two or more of the plurality of output ports.

In another embodiment, a pressure valve may be configured to include a fifth alignment position. The fifth alignment position may result from an axial or radial movement of a flow coupler in a cavity of a housing. The fifth alignment position may configure the pressure valve to modify fluid flow to one of the plurality of output ports. In one example, the fluid flow is modified by using a different cross-section for a passage of the flow coupler. In another example, the fluid flow is modified by longitudinally tapering the passage of the flow coupler. In another example, the fluid flow is filtered by a filter such as a porous filter disposed in the passage of the flow coupler.

In another embodiment, a pressure valve may be configured to include a sixth alignment position. The sixth alignment position may result from an axial or radial movement of a flow coupler in a cavity of a housing. The sixth alignment position may configure the pressure valve to couple two or more of the plurality of output ports of the housing without coupling an input port of the housing.

In another embodiment, a pressure valve may be configured to include a seventh alignment position. The seventh alignment position may result from an axial or radial movement of a flow coupler in a cavity of a housing. The seventh alignment position may configure the pressure valve to couple a first side of a first passage of a flow coupler to an inner wall of the housing using a first seal and to couple a second side of the first passage to the inner wall of the housing using a second seal, resulting in no fluid flow from an input port of the housing to any of a plurality of output ports of the housing.

In another embodiment, a pressure valve may be configured to include an eighth alignment position. The eighth alignment position may result from an axial or radial movement of a flow coupler in a cavity of a housing. The eighth alignment position may configure the pressure valve to couple a first side of a second passage of a flow coupler to an inner wall of the housing using a third seal and to couple a second side of the second passage to the inner wall of the housing using a fourth seal, resulting in no fluid flow from an input port of the housing to any of a plurality of output ports of the housing.

In another embodiment, a pressure valve may include a flow coupler positioned within its housing. The housing may include multiple output ports transversely positioned thereon. Further, one end of the flow coupler may include an input port. The flow coupler may be axially or radially moved within the housing to couple the input port of the flow coupler to one or more output ports of the housing based on various alignment positions of the flow coupler. A passage through the flow coupler may be used to direct fluid flow from the input port of the flow coupler to the one or more output ports of the housing. One end of the passage may have a small seal capable of sealing a single output port. Further, the other end of the passage may have a large seal capable of sealing all of the output ports. In a first alignment position of the flow coupler in the housing of the pressure valve, the passage of the flow coupler may couple the input port of the flow coupler to a single output port of the housing using the small seal. In a second alignment position, the passage may be used to couple the input port of the flow coupler to all of the output ports of the housing using the large seal. For example, FIGS. 3A to 3C illustrate various views of another embodiment of a pressure valve 300*a-c* in accordance with various aspects set forth herein. FIG. 3A illustrates another embodiment of a transverse cross-section of the pressure valve 300*a* in accordance with various aspects set forth herein. FIG. 3B illustrates another embodiment of a transverse cross-section of the pressure valve 300*b* in accordance with various aspects set forth herein. FIG. 3C illustrates another embodiment of a longitudinal cross-section of the pressure valve 300*c* in accordance with various aspects set forth herein. In FIGS. 3A to 3C, the pressure valve 300*a-c* may be configured to include a housing 301*a-c* and a flow coupler 303*a-c*. The flow coupler 303*a-c* may be configured to include an input port 317*a-c* longitudinally disposed in the flow coupler 303*a-c*. The flow coupler 303*a-c* may be disposed around and may define the input port 317*a-c*. The housing 301*a-c* may be configured to include a plurality of output ports 313*a-c* to 316*a-c*. Further, the housing 301a-c may be disposed around and may define a cavity. The flow coupler 303a-c may be disposed in the cavity of the housing 301a-c. A shape of the flow coupler 303a-c may allow for rotational or axial movement of the flow coupler 303a-c. In one example, the shape of the flow coupler 303a-c may be cylindrical. Further, a shape of the cavity of the housing 301a-c may allow for rotational or axial movement of the flow coupler 303a-c in the cavity of the housing 301a-c. In one example, the shape of the cavity of the housing 301a-c may be substantially similar to the shape of the flow coupler 303a-c. In another example, the shape of the cavity of the housing 301a-c may be cylindrical. A longitudinal length of the cavity of the housing 301a-c may allow for axial movement of the flow coupler 303a-c in the cavity of the housing 301a-c.

In FIGS. 3A to 3C, the flow coupler 303a-c may be configured to include a passage 305a-c, which may be transversely disposed through the flow coupler 303a-c. The flow coupler 303a-c may be disposed around and may define the passage 305a-c. The passage 305a-c may be coupled to the input port 317a-c of the flow coupler 303a-c. The flow coupler 303a-c may be configured to include a first seal 307a-c and a second seal 308a-c. The first seal 307a-c may be coupled to a first end of the passage 305a-c of the flow coupler 303a-c. The first seal 307a-c may be used to couple the first end of the passage 305a-c to one of the plurality of output ports 313a-c to 316a-c, an inner surface of the housing 301a-c or the like. The first seal 307a-c may be a small O-ring. In one example, a radial width of an opening associated with the first seal 307a-c may be about a radial width of one of the plurality of output ports 313a-c to 316a-c. In another example, the radial width of the opening associated with the first seal 307a-c may be sufficient to couple the passage 305a-c to one of the plurality of output ports 313a-c to 316a-c of the housing 301a-c.

Furthermore, the second seal 308a-c may be coupled to a second end of the passage 305a-c of the flow coupler 303a-c. The second seal 308a-c may be used to couple the second end of the passage 305a-c to one or more of the plurality of output ports 313a-c to 316a-c, the inner surface of the housing 301a-c or the like. In one example, the second seal 308a-c is used to couple the second end of the passage 305a-c to the one or more of the plurality of output ports 313a-c to 316a-c while the first seal 307a-c is used to couple the first end of the passage 305a-c to the inner surface of the housing 301a-c. In another example, the first seal 307a-c is used to couple the second end of the passage 305a-c to one of the plurality of output ports 313a-c to 316a-c while the second seal 308a-c is used to couple the first end of the passage 305a-c to the inner surface of the housing 301a-c. The second seal 308a-c may be a large O-ring. In one example, a radial width of an opening associated with the second seal 308a-c may be about a radial width between the furthest separated output ports of the plurality of output ports 313a-c to 316a-c at an inner surface of the housing 301a-c. In another example, the radial width of the opening associated with the second seal 308a-c may be sufficient to couple the passage 305a-c to all of the plurality of output ports 313a-c to 316a-c.

In FIG. 3A, the pressure valve 300a may be configured to allow the flow coupler 303a in the cavity of the housing 301a to be placed into a plurality of alignment positions by using axial or radial movement thereof. A first alignment position of the flow coupler 303a in the cavity of the housing 301a may configure the pressure valve 300a to allow fluid flow from the input port 317a of the flow coupler 303a through the passage 305a of the flow coupler 303a to one or more of the plurality of output ports 313a-316a using the second seal 308a. In one example, the first alignment position is associated with the input port 317a being coupled to all of the plurality of output ports 313a-316a.

In FIG. 3B, a second alignment position of the flow coupler 303b in the cavity of the housing 301b may configure the pressure valve 300b to allow fluid flow from the input port 317b of the flow coupler 303b through the passage 305b of the flow coupler 303b to one of the plurality of output ports 313b-316b of the housing 301b using the first seal 307b.

In FIG. 3C, the input port 317c is disposed in the flow coupler 303c of the pressure valve 300c, which may also be referred to as a handle of the pressure valve 300c. When the flow coupler 303c is moved in the cavity of the housing 301c to the first alignment position, the input port 317c of the flow coupler 303c may be coupled to the one or more of the plurality of output ports 313c-316c of the housing 301c using the second seal 308c. When the flow coupler 303c is radially moved about one hundred and eighty degrees (180°) in the cavity of the housing 301c from the first alignment position to the second alignment position, the input port 317c of the flow coupler 303c may be coupled to one of the plurality of output ports 313c-316c of the housing 301c using the first seal 307c.

Furthermore, a third alignment position of the flow coupler 303c in the cavity of the housing 301c may configure the pressure valve 300c to allow fluid flow from the input port 317c of the flow coupler 303c to another output port 319c of the housing 301c. A portion of the cavity 304c of the housing 301c may be used to allow the flow coupler 303c to be axially moved. In one example, the flow coupler 303c is pushed into the cavity of the housing 301c to engage the pressure valve 300c in the third alignment position. The third alignment position may be associated with the input port 317c of the flow coupler 303c being coupled to the other output port 319c of the housing 301c. An elastic object 321c such as a spring may be positioned in the portion of the cavity 304c of the housing 301c, which may be used to counteract a force of the fluid flow through the input port 317c of the flow coupler 303c.

In another embodiment, a fourth alignment position may be associated with axially or radially moving a flow coupler in a cavity of a housing so that a passage of the flow coupler is coupled to inner walls of the housing using a first seal and a second seal.

In another embodiment, a pressure valve may include a flow coupler positioned within its housing. The housing may include an input port and multiple output ports transversely positioned thereon. The flow coupler may be axially or radially moved within the housing to couple the input port to one or more output ports based on various alignment positions of the flow coupler. A passage through the flow coupler may be used to direct fluid flow from the input port to the one or more output ports. One end of the passage may have a small seal capable of sealing a single output port. Further, the other end of the passage may have a large seal capable of sealing all of the output ports. In a first alignment position of the flow coupler in the housing of the pressure valve, the passage of the flow coupler may couple the input port to a single output port. In this position, the large seal may be used to couple the passage to the input port, which allows the flow coupler to be radially moved to couple the passage to any one of the output ports. In a second alignment position, the passage may be used to couple the input port to all of the output ports. In this position, the large seal may be used to couple the passage to all of the output ports while the small seal may be used to couple the passage to the input port. For example, FIGS. 4A to 4D illustrate another embodiment of a pressure valve 400*a*-*d* in accordance with various aspects set forth herein. FIG. 4A illustrates another embodiment of a transverse cross-section of the pressure valve 400*a* in accordance with various aspects set forth herein. FIG. 4B illustrates another embodiment of a transverse cross-section of the pressure valve 400*b* in accordance with various aspects set forth herein. FIG. 4C illustrates another embodiment of a transverse cross-section of the pressure valve 400*b* in accordance with various aspects set forth herein. FIG. 4D illustrates another embodiment of a longitudinal cross-section of the pressure valve 400*c* in accordance with various aspects set forth herein. In FIGS. 4A to 4D, the pressure valve 400*a*-*d* may be configured to include a housing 401*a*-*d* and a flow coupler 403*a*-*d*. The housing 401*a*-*d* may be configured to include an input port 411*a*-*d* transversely disposed in the housing 401*a*-*d*. The housing 401*a*-*d* may be disposed around and may define the input port 411*a*-*d*. The housing 401*a*-*d* may be configured to include a plurality of output ports 413*a*-*d* to 416*a*-*d*. Further, the housing 401*a*-*d* may be disposed around and may define a cavity. The flow coupler 403*a*-*d* may be disposed in the cavity of the housing 401*a*-*d*. A shape of the flow coupler 403*a*-*d* may allow for rotational or axial movement of the flow coupler 403*a*-*d* in the cavity of the housing 401*a*-*d*. In one example, the shape of the flow coupler 403*a*-*d* may be cylindrical. Further, a shape of the cavity of the housing 401*a*-*d* may allow for rotational or axial movement of the flow coupler 403*a*-*d*. In one example, the shape of the cavity of the housing 401*a*-*d* may be substantially similar to the shape of the flow coupler 403*a*-*d*. In another example, the shape of the cavity of the housing 401*a*-*d* may be cylindrical. A longitudinal length of the cavity of the housing 401*a*-*d* may allow for axial movement of the flow coupler 403*a*-*d* in the cavity of the housing 401*a*-*d*.

In FIGS. 4A to 4D, the flow coupler 403*a*-*d* may be configured to include a passage 405*a*-*d*, which may be transversely disposed through the flow coupler 403*a*-*d*. The flow coupler 403*a*-*d* may be disposed around and may define the passage 405*a*-*d*. The flow coupler 403*a*-*d* may be configured to include a first seal 407*a*-*d* and a second seal 408*a*-*d*. The first seal 407*a*-*d* may be coupled to a first end of the passage 405*a*-*d* of the flow coupler 403*a*-*d*. The first seal 407*a*-*d* may be used to couple the first end of the passage 405*a*-*d* to the input port 411*a*-*d*, one of the plurality of output ports 413*a*-*d* to 416*a*-*d*, an inner surface of the housing 401*a*-*d* or the like. The first seal 407*a*-*d* may be a small O-ring. In one example, a radial width of an opening associated with the first seal 407*a*-*d* may be about a radial width of one of the plurality of output ports 413*a*-*d* to 416*a*-*d* at the inner surface of the housing 401*a*-*d*. In another example, the radial width of the opening associated with the first seal 407*a*-*d* may be sufficient to couple the passage 405*a*-*d* to one of the plurality of output ports 413*a*-*d* to 416*a*-*d*. In another example, the radial width of the opening associated with the first seal 407*a*-*d* may be sufficient to couple the passage 405*a*-*d* to the input port 411*a*-*d*.

Furthermore, the second seal 408*a*-*d* may be coupled to a second end of the passage 405*a*-*d* of the flow coupler 403*a*-*d*. The second seal 408*a*-*d* may be used to couple the second end of the passage 405*a*-*d* to the input port 411*a*-*d*, one or more of the plurality of output ports 413*a*-*d* to 416*a*-*d*, an inner surface of the housing 401*a*-*d* or the like. In one example, the first seal 407*a*-*d* is used to couple the first end of the passage 405*a*-*d* to the one of the plurality of output ports 413*a*-*d* to 416*a*-*d* while the second seal 408*a*-*d* is used to couple the second end of the passage 405*a*-*d* to the input port 411*a*-*d*. In another example, the second seal 408*a*-*d* is used to couple the second end of the passage 405*a*-*d* to all of the plurality of output ports 413*a*-*d* to 416*a*-*d* while the first seal 407*a*-*d* is used to couple the first end of the passage 405*a*-*d* to the input port 411*a*-*d*. The second seal 408*a*-*d* may be a large O-ring. In one example, a radial width of an opening associated with the second seal 408*a*-*d* may be about a radial width between the furthest separated output ports of the plurality of output ports 413*a*-*d* to 416*a*-*d* at the inner surface of the housing 401*a*-*d*. In another example, the radial width of the opening associated with the second seal 408*a*-*d* may be sufficient to couple the passage 405*a*-*d* to all of the plurality of output ports 413*a*-*d* to 416*a*-*d*. In another example, the radial width of the second seal 408*a*-*d* may be sufficient to allow the first end of the passage 405*a*-*d* to radially move to each of the plurality of output ports 413*a*-*d* to 416*a*-*d* while coupling the input port 411*a*-*d* to the second end of the passage 405*a*-*d* using the second seal 408*a*-*d*.

In FIG. 4A, the pressure valve 400*a* may be configured to allow the flow coupler 403*a* in the cavity of the housing 401*a* to be placed into a plurality of alignment positions by using axial or radial movement thereof. A first alignment position of the flow coupler 403*a* in the cavity of the housing 401*a* may configure the pressure valve 400*a* to allow fluid flow from the input port 411*a* coupled to the first end of the passage 405*a* using the first seal 407*a* to all of the plurality of output ports 413*a*-416*a* coupled to the second end of the passage 405*a* using the second seal 408*a*.

In FIG. 4B, a second alignment position of the flow coupler 403*b* in the cavity of the housing 401*b* may configure the pressure valve 400*b* to allow fluid flow from the input port 411*b* coupled to the second end of the passage 405*b* using the second seal 408*b* to one of the plurality of output ports 413*b*-416*b* coupled to the first end of the passage 405*b* using the first seal 407*b*.

In FIG. 4C, a third alignment position of the flow coupler 403*c* in the cavity of the housing 401*c* may configure the pressure valve 400*c* to allow fluid flow from the input port 411*c* coupled to the second end of the passage 405*c* using the second seal 408*c* to another one of the plurality of output ports 413*c*-416*c* coupled to the first end of the passage 405*c* using the first seal 407*c*.

In FIG. 4D, a fourth alignment position of the flow coupler 403*d* in the cavity of the housing 401*d* may configure the pressure valve 400*d* to allow fluid flow from another input port 418*d* of the housing 401*d* to another output port 419*d* of the housing 401*d*. A portion of the cavity 404*d* of the housing 401*d* may be used to allow the flow coupler 403*d* to be axially moved to a plurality of positions. In one example, the flow coupler 403*d* is pushed into the cavity of the housing 401*d* to engage the pressure valve 400*d* in the fourth alignment position.

In another embodiment, a method may include, at a pressure valve including a housing having an input port and a plurality of output ports and a flow coupler having a passage transversely disposed therethrough, wherein the flow coupler is disposed in a cavity defined by the housing and is movable within the cavity, positioning the flow coupler in the cavity of the housing to a first alignment position to allow fluid flow from the input port of the housing through the passage of the flow coupler to one of the plurality of output ports of the housing. Further, the method may include positioning the flow coupler in the cavity of the housing to a second alignment position to allow fluid flow from the input port of the housing through the passage of the flow coupler to one or more of the plurality of output ports of the housing. Also, the method may include positioning the flow coupler in the cavity of the housing to a third alignment position to allow fluid flow from the input port of the housing through the passage of the flow coupler to another of the plurality of output ports of the housing.

In another embodiment, a pressure valve may include a flow coupler positioned within its housing. The housing may include an input port and multiple output ports longitudinally positioned thereon. The flow coupler may be axially or radially moved within the housing to couple the input port to one or more output ports based on various alignment positions of the flow coupler. Passages through the flow coupler may be used to direct fluid flow from the input port to the one or more output ports. In a first alignment position of the center flow coupler in the pressure valve, a first passage in a first portion of the center flow coupler may be used to couple the input port to a single output port. In a second alignment position, a second passage in a second portion of the center flow coupler may be used to couple the input port to multiple output ports. For example, FIGS. 5A and 5B illustrate various views of another embodiment of a pressure valve 500*a-b* in accordance with various aspects set forth herein. FIG. 5A illustrates another embodiment of a transverse cross-section of the pressure valve 500*a* in accordance with various aspects set forth herein. FIG. 5B illustrates another embodiment of a transverse cross-section of the pressure valve 500*b* in accordance with various aspects set forth herein. In FIGS. 5A to 5B, the pressure valve 500*a-b* may be configured to include a housing 501*a-b* and a flow coupler 503*a-b*. The flow coupler 503*a-b* may be configured to include an input port 517*a-b* longitudinally disposed in and defined by the flow coupler 503*a-c*. The housing 501*a-b* may be configured to include a plurality of output ports 513*a-b* to 516*a-b* longitudinally positioned on the housing 501*a-b*, with each of the plurality of output ports transversely disposed in and defined by the housing 501*a-b*. Further, the housing 501*a-b* may be disposed around and may define a longitudinal cavity. The flow coupler 503*a-b* may be disposed in the longitudinal cavity of the housing 501*a-b*. A shape of the flow coupler 503*a-b* may allow for rotational or axial movement of the flow coupler 503*a-b* in the cavity of the housing 501*a-b*. In one example, the shape of the flow coupler 503*a-b* may be cylindrical, rectangular or the like. Further, a shape of the cavity of the housing 501*a-b* may allow for rotational or axial movement of the flow coupler 503*a-b*. In one example, the shape of the cavity of the housing 501*a-b* may be substantially similar to the shape of the flow coupler 503*a-b*. In another example, the shape of the cavity of the housing 501*a-b* may be cylindrical rectangular or the like. The pressure valve 500*a-b* may be configured to allow the flow coupler 503*a-b* in the cavity of the housing 501*a-b* to be placed into a plurality of alignment positions by using axial or radial movement thereof. The flow coupler 503*a-b* may be capable of axial or radial movement in the cavity of the housing 501*a-b*.

In FIGS. 5A and 5B, the flow coupler 503*a-b* may be configured to include a first passage 505*a-b* and a second passage 506*a-b*. The first passage 505*a-b* may be disposed in and defined by a first portion of the flow coupler 503*a-b*. Further, the second passage 506*a-b* may be disposed in and defined by a second portion of the flow coupler 503*a-b*. Each of the first passage 505*a-b* and the second passage 506*a-b* may be coupled to the input port 517*a-b* of the flow coupler 503*a-b*. The flow coupler 503*a-b* may be configured to include a first seal 507*a-b*, a second seal 508*a-b*, a third seal 509*a-b* and a fourth seal 510*a-b*. The first seal 507*a-b* may be coupled to one side of the first passage 505*a-b* of the flow coupler 503*a-b* and the second seal 508*a-b* may be coupled to another side of the first passage 505*a-b* of the flow coupler 503*a-b*. The first seal 507*a-b* and the second seal 508*a-b* may provide a seal for the passage 505*a-b*. Further, the first seal 507*a-b* and the second seal 508*a-b* may be an O-ring. Similarly, the third seal 509*a-b* may be coupled to one side of the second passage 506*a-b* of the flow coupler 503*a-b* and the fourth seal 510*a-b* may be coupled to another side of the second passage 506*a-b* of the flow coupler 503*a-b*. The third seal 509*a-b* and the fourth seal 510*a-b* may provide a seal for the second passage 506*a-h*. Further, the third seal 509*a-b* and the fourth seal 510*a-b* may be an O-ring.

In FIG. 5A, a first alignment position of the flow coupler 503*a* in the cavity of the housing 501*a* may position a first portion of the flow coupler 503*a* with one of the plurality of output ports 513*a*-516*a*. The first alignment position may be associated with the pressure valve 500*a* providing fluid flow from the input port 517*a* of the flow coupler 503*a* through the first passage 505*a* of the flow coupler 503*a* to one of the plurality of output ports 513*a*-516*a* using the first seal 507*a* and the second seal 508*a*.

In FIG. 5B, a second alignment position of the flow coupler 503*b* in the cavity of the housing 501*b* may position a second portion of the flow coupler 503*a* with one or more of the plurality of output ports 513*a*-516*a*. The second alignment position may be associated with the pressure valve 500*b* providing fluid flow from the input port 517*b* of the flow coupler 503*b* through the second passage 506*b* of the flow coupler 503*b* to one or more of the plurality of output ports 513*b*-516*b* of the housing 501*b* using the third seal 509*b* and the fourth seal 510*b*. In one example, the second alignment position is associated with the input port 517*b* being coupled to all of the plurality of output ports 513*b*-516*b*.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned single and grouped pressure valve, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A pressure valve, comprising:
    a housing having a first input port and a plurality of output ports and defining a cavity disposed therein;
    a flow coupler disposed in the cavity of the housing and having a passage transversely disposed therethrough, wherein the flow coupler is movable within the cavity of the housing;
    wherein the flow coupler further includes a first seal coupled to a first end of the passage of the flow coupler and a second seal coupled to a second end of the passage of the flow coupler;
    wherein the first seal couples the first end of the passage of the flow coupler to the input port of the housing and the second seal couples the second end of the passage of the flow coupler to one or more of the plurality of output ports of the housing;
    wherein a first alignment position of the flow coupler in the cavity of the housing allows fluid flow from the first input port of the housing through the passage of the flow coupler to all of the plurality of output ports of the housing; and
    wherein a second alignment position of the flow coupler in the cavity of the housing allows fluid flow from the first input port of the housing through the passage of the flow coupler to one of the plurality of output ports of the housing.

2. The pressure valve of claim 1, wherein a third alignment position of the flow coupler in the cavity of the housing allows fluid flow from the input port of the housing through the passage of the flow coupler to another one of the plurality of output ports of the housing.

3. The pressure valve of claim 1, wherein each of the first seal and the second seal is an O-ring.

4. The pressure valve of claim 1, wherein the first seal couples the first end of the passage of the flow coupler to one of the plurality of output ports of the housing and the second seal couples the second end of the passage of the flow coupler to the input port of the housing.

5. The pressure valve of claim 1, wherein the flow coupler in the cavity of the housing is rotated from the first alignment position to the second alignment position.

6. The pressure valve of claim 1, wherein the housing further includes a second input port and a second output port; and
    wherein a fourth alignment position of the flow coupler in the cavity of the housing allows fluid flow from the second input port of the housing through the passage of the flow coupler to the second output port of the housing.

7. A pressure valve, comprising:
    a housing having an input port and a plurality of output ports and defining a cavity disposed therein;
    a flow coupler disposed in the cavity of the housing and moveable therein, wherein a first portion of the flow coupler has a first passage transversely disposed therethrough and a second portion of the flow coupler has a second passage transversely disposed therethrough;
    wherein the flow coupler further includes a first seal coupled to a first end of the first passage of the flow coupler, a second seal coupled to a second end of the first passage of the flow coupler, a third seal coupled to a first end of the second passage of the flow coupler and a fourth seal coupled to a second end of the second passage of the flow coupler;
    wherein the first seal couples the first end of the first passage of the flow coupler to the input port of the housing and the second seal couples the second end of the first passage of the flow coupler to one or more of the plurality of output ports of the housing;
    wherein a first alignment position of the flow coupler in the cavity of the housing allows fluid flow from the input port of the housing through the first passage of the flow coupler to all of the plurality of output ports of the housing; and
    wherein a second alignment position of the flow coupler in the cavity of the housing allows fluid flow from the input port of the housing through the second passage of the flow coupler to one of the plurality of output ports of the housing.

8. The pressure valve of claim 7, wherein a third alignment position of the flow coupler in the cavity of the housing allows fluid flow from the input port of the housing through the second passage of the flow coupler to another one of the plurality of output ports of the housing.

9. The pressure valve of claim 7, wherein the flow coupler in the cavity of the housing is axially moved from the first alignment position to the second alignment position.

10. The pressure valve of claim 7, wherein each of the first seal, the second seal, the third seal and the fourth seal is an O-ring.

11. The pressure valve of claim 7, wherein the third seal couples the first end of the second passage of the flow coupler to the input port of the housing and the fourth seal couples the second end of the second passage of the flow coupler to one of the plurality of output ports of the housing.

* * * * *